(12) United States Patent
Yashin

(10) Patent No.: US 11,396,966 B2
(45) Date of Patent: Jul. 26, 2022

(54) SYSTEM, METHOD AND APPARATUS FOR SHEATHED RETAINER FOR A RESTRAINED PIPE JOINT

(71) Applicant: Westlake Chemical Corporation, Houston, TX (US)

(72) Inventor: Dmitry Yashin, Haverford, PA (US)

(73) Assignee: WESTLAKE CHEMICAL CORPORATION, Houston, TX (US)

( * ) Notice: Subject to any disclaimer, the term of this patent is extended or adjusted under 35 U.S.C. 154(b) by 798 days.

(21) Appl. No.: 15/855,789

(22) Filed: Dec. 27, 2017

(65) Prior Publication Data
US 2018/0180207 A1    Jun. 28, 2018

Related U.S. Application Data

(60) Provisional application No. 62/439,247, filed on Dec. 27, 2016.

(51) Int. Cl.
*F16L 37/084*    (2006.01)

(52) U.S. Cl.
CPC ......... *F16L 37/084* (2013.01); *F16L 37/0841* (2013.01)

(58) Field of Classification Search
CPC .............................. F16L 37/084; F16L 37/0841
USPC .................................................. 285/305, 307
See application file for complete search history.

(56) References Cited

U.S. PATENT DOCUMENTS

| | | | |
|---|---|---|---|
| 2,354,538 A | 7/1944 | Parker | |
| 3,532,367 A | 10/1970 | Roos | |
| 3,672,708 A * | 6/1972 | Zemberry | F16L 37/084 285/315 |
| 3,887,222 A * | 6/1975 | Hammond | F16L 37/088 285/307 |
| 5,662,360 A | 9/1997 | Guzowski | |
| 7,284,310 B2 | 10/2007 | Jones et al. | |
| 7,445,250 B2 * | 11/2008 | Swift | F16L 37/0887 285/321 |
| 7,455,108 B2 | 11/2008 | Jenkins et al. | |
| 7,537,248 B2 | 5/2009 | Jones et al. | |
| 7,696,886 B2 | 4/2010 | Lai | |
| 9,435,381 B2 | 9/2016 | Larson | |

(Continued)

FOREIGN PATENT DOCUMENTS

| | | |
|---|---|---|
| EP | 0524167 B1 | 9/1996 |
| WO | 2016056920 A1 | 4/2016 |

*Primary Examiner* — James M Hewitt, II
(74) *Attorney, Agent, or Firm* — Lempia Summerfield Katz LLC

(57) ABSTRACT

Provided are pipe systems and methods for assembling the same. A pipe system includes two pipes, each having an axis, an exterior surface, a retainer groove formed in the exterior surface, and a sheath mounted to a respective pipe such that the sheath at least partially covers the retainer groove prior to assembly. A retainer is also located in the each retainer groove, disposed radially beneath the sheath relative to the axis, prior to assembly. The system further includes a coupling having a bell configured to receive each of the two pipes. Each bell may have a retainer groove formed in an inner surface thereof and the bell configured to receive at least a portion of a respective retainer after assembly of the pipe system. When assembled, the sheaths are configured to uncover the retainer grooves such that the retainers expand into the retainer grooves of the coupling inner surface.

7 Claims, 8 Drawing Sheets

(56) References Cited

U.S. PATENT DOCUMENTS

| | | |
|---|---|---|
| 9,443,186 B2 | 9/2016 | Lovell |
| 9,470,352 B2 | 10/2016 | Schooley et al. |
| 9,471,819 B2 | 10/2016 | Tucker et al. |
| 2010/0201118 A1* | 8/2010 | Anton .................... G01D 21/00 285/93 |
| 2010/0225111 A1 | 9/2010 | Owen |
| 2013/0285829 A1 | 10/2013 | Pacheco et al. |

* cited by examiner

SYSTEM, METHOD AND APPARATUS FOR SHEATHED RETAINER FOR A RESTRAINED PIPE JOINT

This application claims priority to and the benefit of U.S. Prov. App. No. 62/439,247, filed Dec. 27, 2016, which is incorporated herein by reference in its entirety.

BACKGROUND OF THE INVENTION

Field of the Disclosure

The present invention relates in general to pipes and, in particular, to a system, method, and apparatus for a sheathed retainer for a restrained pipe joint.

Description of the Prior Art

Conventional spline-type, restrained pipe joint systems typically have splines that are separate from the pipes. The splines can be lost during transportation or disassembly. Examples of such designs include U.S. Pat. Nos. 5,662,360, 7,284,310, and 7,537,248. There are no "push to lock" type pipe joints that rely on a spline that automatically "expands" to open, and then snaps into place. Some users would prefer a quicker installation of restrained joint pipe that does not require "reversibility" (i.e., the ability to take the joint apart after assembly), and yet still provide a robust pipe joint system. Thus, improvements in pipe restrained joints continue to be of interest.

SUMMARY

Embodiments of a system, method and apparatus for a sheathed, spline locking pipe joint are disclosed. For example, a pipe may include a tubular member having a central axis, an exterior surface, and a spline groove formed in the exterior surface. A sheath may be mounted to the tubular member such that the sheath at least partially covers the spline groove. A spline may be located in the spline groove radially beneath the sheath relative to the central axis.

In another embodiment, a pipe assembly may include a first pipe having a bell, a second pipe having a spigot end, a sheath, and a spline. The first pipe may include a bell having an open end and an axis that is central and longitudinally-extending. The bell may include an inner radius relative to the axis and a spline groove. The first pipe may have an inner radius defined at an inner circumference of the bell at positions not having a spline groove or a seal groove. The second pipe may have an exterior surface and a spline groove in the exterior surface. The spigot end of the second pipe may have an outer radius relative to the axis that is smaller than the inner radius of the bell and disposed within the bell substantially along the axis. The sheath may be disposed around the spigot end of the second pipe such that the sheath at least partially covers the spline groove. The spline may be located in the spline groove radially beneath the sheath relative to the axis.

In an embodiment, a pipe system may include a first pipe and a second pipe that is configured to receive the first pipe. The first pipe may include an axis, an exterior surface, and a first spline groove formed in the exterior surface. A sheath may be mounted to the first pipe such that the sheath at least partially covers the first spline groove prior to assembly of the pipe system. A spline may be located in the first spline groove and positioned radially beneath the sheath relative to the axis prior to assembling the pipe system. The second pipe may have a second spline groove configured to receive at least a portion of the spline after the pipe system is assembled. When the pipe system is assembled, the sheath may be configured to uncover the first spline groove such that the spline expands into the second spline groove.

In another embodiment, a pipe system may include first and second pipes and a coupling. The first and second pipes may each have an axis, an exterior surface, and a spline groove formed in the exterior surface. A sheath may be configured to be mounted to each of the first and second pipes such that the sheath at least partially covers the spline groove prior to assembly of the pipe system. A spline may be configured to be located in the spline groove and positioned radially beneath the sheath relative to the axis prior to assembly of the pipe system. The coupling may have a bell for each of the first and second pipes. Each bell may be configured to receive the respective first or second pipe; and each bell may have a second spline groove configured to receive at least a portion of a respective spline after assembly of the pipe system. When the pipe system is assembled, the sheaths may be configured to uncover the spline grooves such that the splines expand into the second spline grooves.

In an embodiment, a method of joining pipes may include providing a first pipe with an axis and inserting the first pipe into a bell of a second pipe. The first pipe may have an exterior surface and a spline groove formed in the exterior surface. A sheath may be mounted to the first pipe such that the sheath at least partially covers the spline groove. A spline may be located in the spline groove radially beneath the sheath relative to the axis. The first pipe may be inserted into a bell of a second pipe such that the sheath is at least partially displaced to uncover the spline. The method may further include expanding the spline into a second spline groove in the second pipe to form a pipe assembly.

In another embodiment, a method of joining pipes may include providing first and second pipes. Each of the pipes may have a same axis and a respective exterior surface having a spline groove formed therein. A sheath may be mounted to each pipe such that the sheath at least partially covers a respective spline groove. A spline may be located in each of the spline grooves radially beneath a respective sheath relative to the axis. The method may further include inserting each of the pipes into a respective bell of a coupling such that the sheaths are at least partially displaced to uncover the splines. The method may include expanding the splines of the pipes into respective second spline grooves in the coupling to form a pipe assembly.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method, and apparatus for a sheathed retainer for a restrained pipe joint are disclosed.

Pipe System—With Coupling

Figure 1:
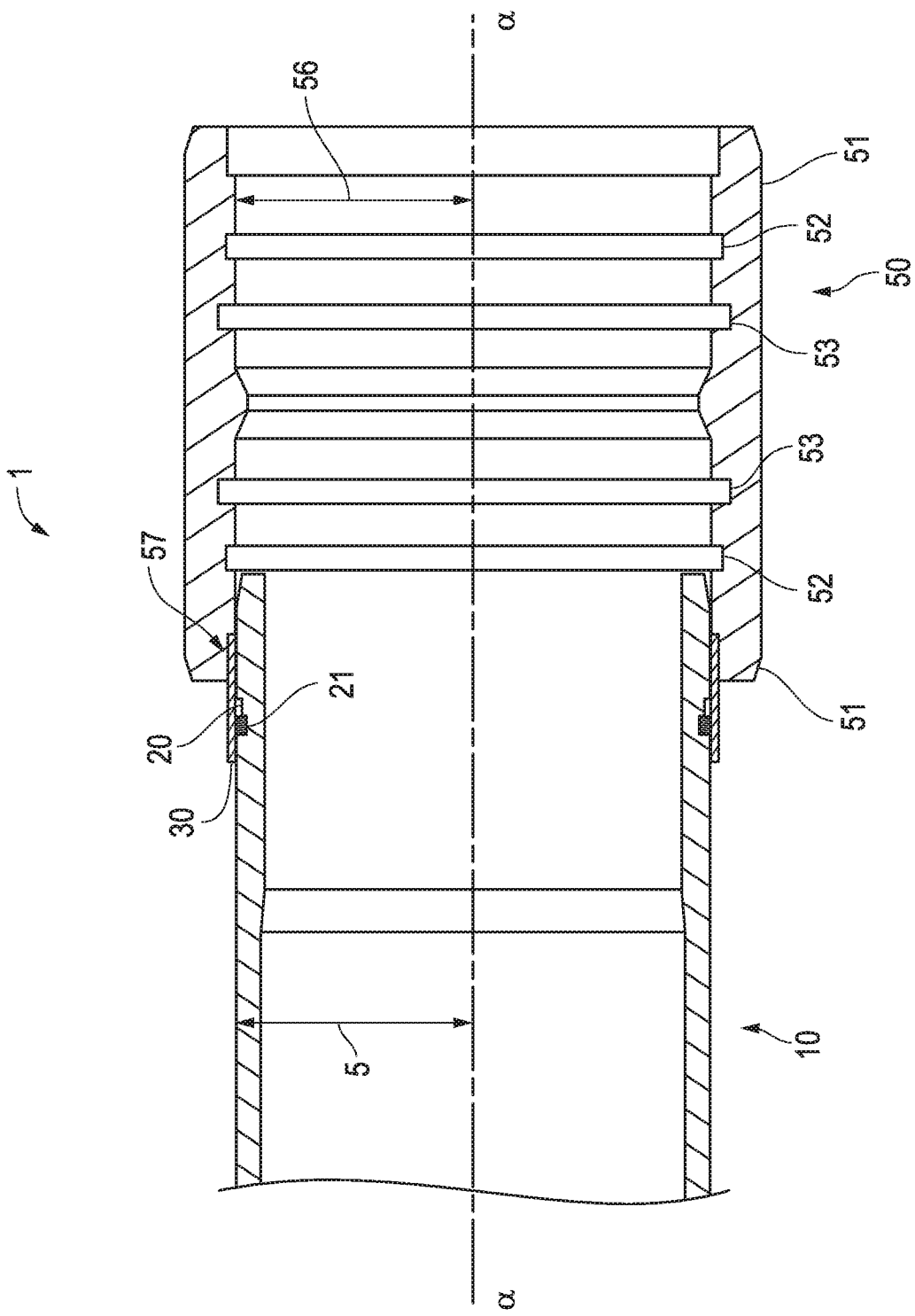
FIG. 1 is sectional side view illustrating a portion of a joint in a pipe system including a pipe and a coupling, according to an embodiment of the present disclosure.
Figure 2:
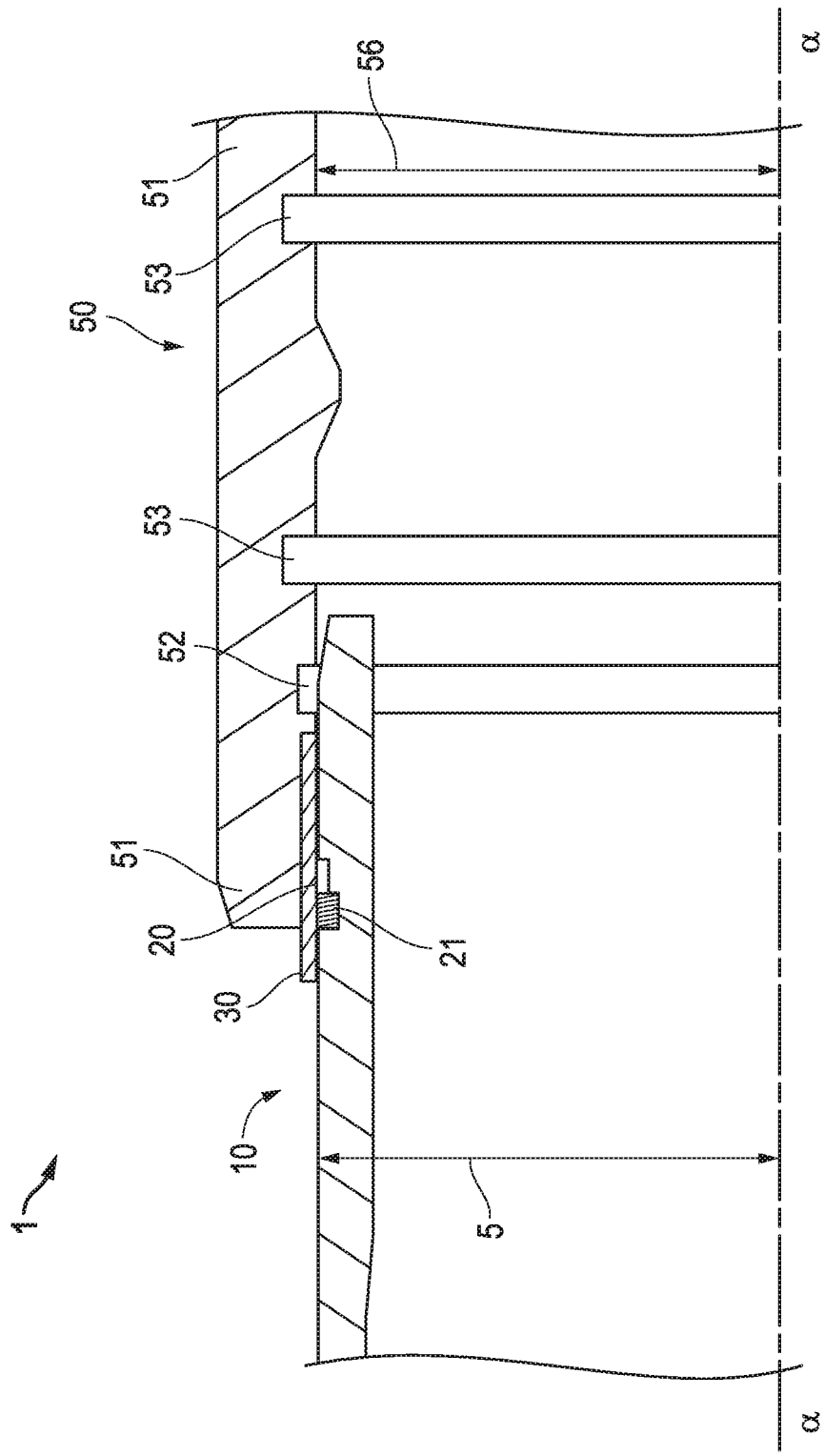
FIG. 2 is an enlarged sectional side view illustrating a portion of an embodiment of the joint of FIG. 1, according to an embodiment of the present disclosure.
Figure 3:
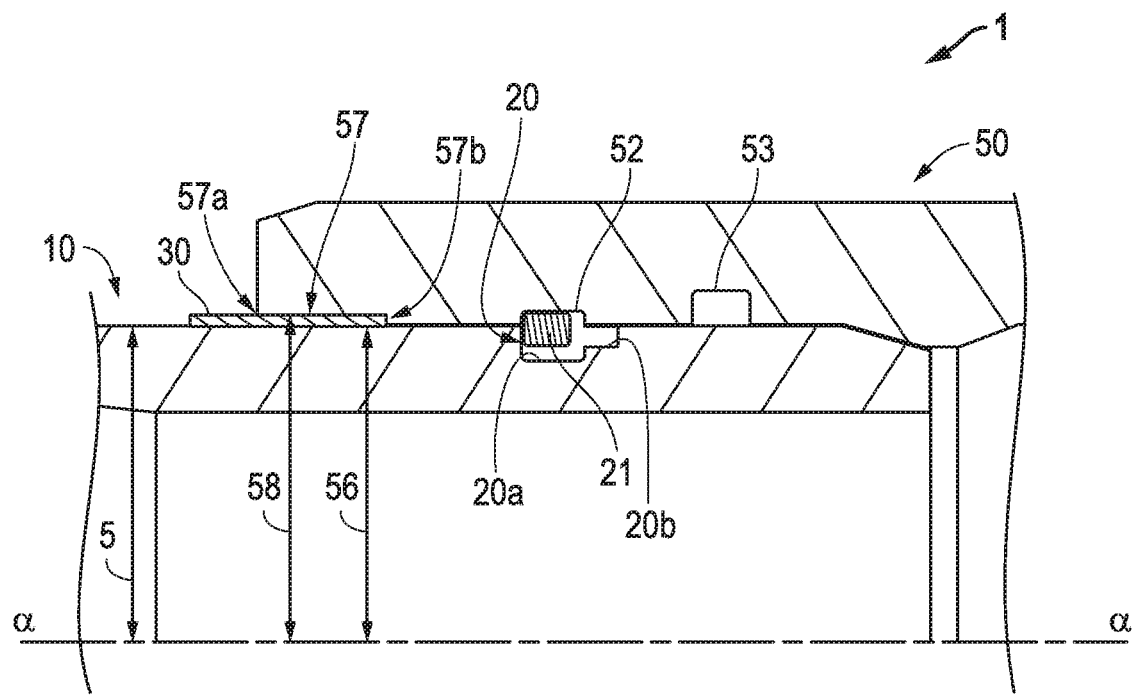
FIG. 3 is an enlarged sectional side view illustrating a portion of the joint of FIG. 1 when the pipe is fully inserted into the bell of the coupling, according to an embodiment of the present disclosure.

As shown in FIGS. 1-4, various embodiments may comprise a pipe system for connecting two pipes 10 and forming a joint 1. FIGS. 1-3 show the pipe system at various points during insertion of pipe 10 into a coupling 50. FIG. 1 provides a sectional side view illustrating a portion of a joint 1 in a pipe system including a pipe 10 and a coupling 50, according to an embodiment of the present disclosure.

For example, the system may include a coupling 50 having an axis α and a generally cylindrical, hollow shape extending in the axial direction. A female end 51 may be formed on each axial end of the coupling 50. Each female end 51 may have a bell shape and be configured to receive a male end (e.g. spigot end) of respective pipes 10.

Embodiments of each female end 51 may include an inner radius 56 and interior surface positioned at the inner radius 56 that is larger than the outer radius 5 corresponding to the exterior surface of the pipes 10. In some embodiments, each female end 51 may have a number of grooves formed in the interior surface. For example, as shown in FIGS. 1-4, a retainer groove such as a spline groove 52 and a seal groove 53 may be formed in the interior surface of each female end 51. In some embodiments, spline groove 52 may be configured to receive at least a portion of a respective retainer, such as a spline, during assembly of the pipe system.

In various embodiments, the pipes 10 may be substantially coaxial with each other and with the coupling axis α. Each of the pipes 10 includes an exterior surface 5, and a spline groove 20 formed in the exterior surface 5 thereof. A sheath 30, such as a ring with a flat radial profile, may be configured to be mounted to each pipe 10. The sheath 30 may be mounted in such a manner as to at least partially cover the spline groove 20 formed in the exterior surface 5 of the pipe 10 prior to assembly of the pipe system.

Figure 4A:
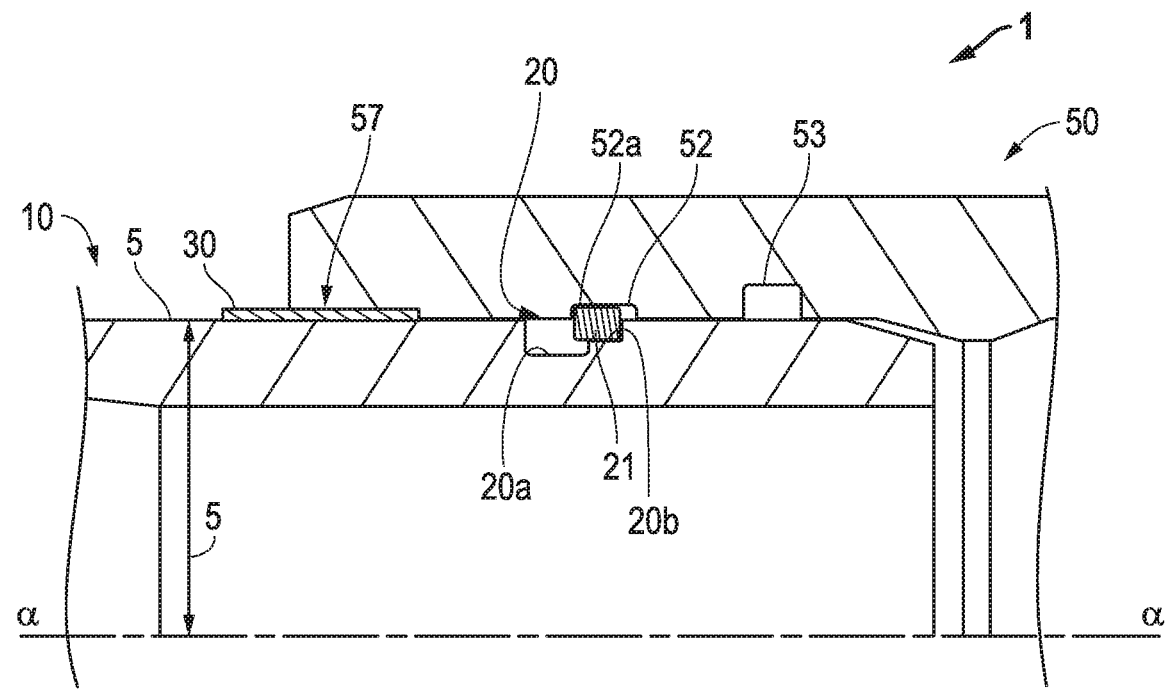
FIGS. 4a & 4b are enlarged sectional side views illustrating a portion of the joint of FIG. 1 when the pipes are in a locked position and when a force is being exerted in a direction away from the joint, according to an embodiment of the present disclosure.
Figure 4B:
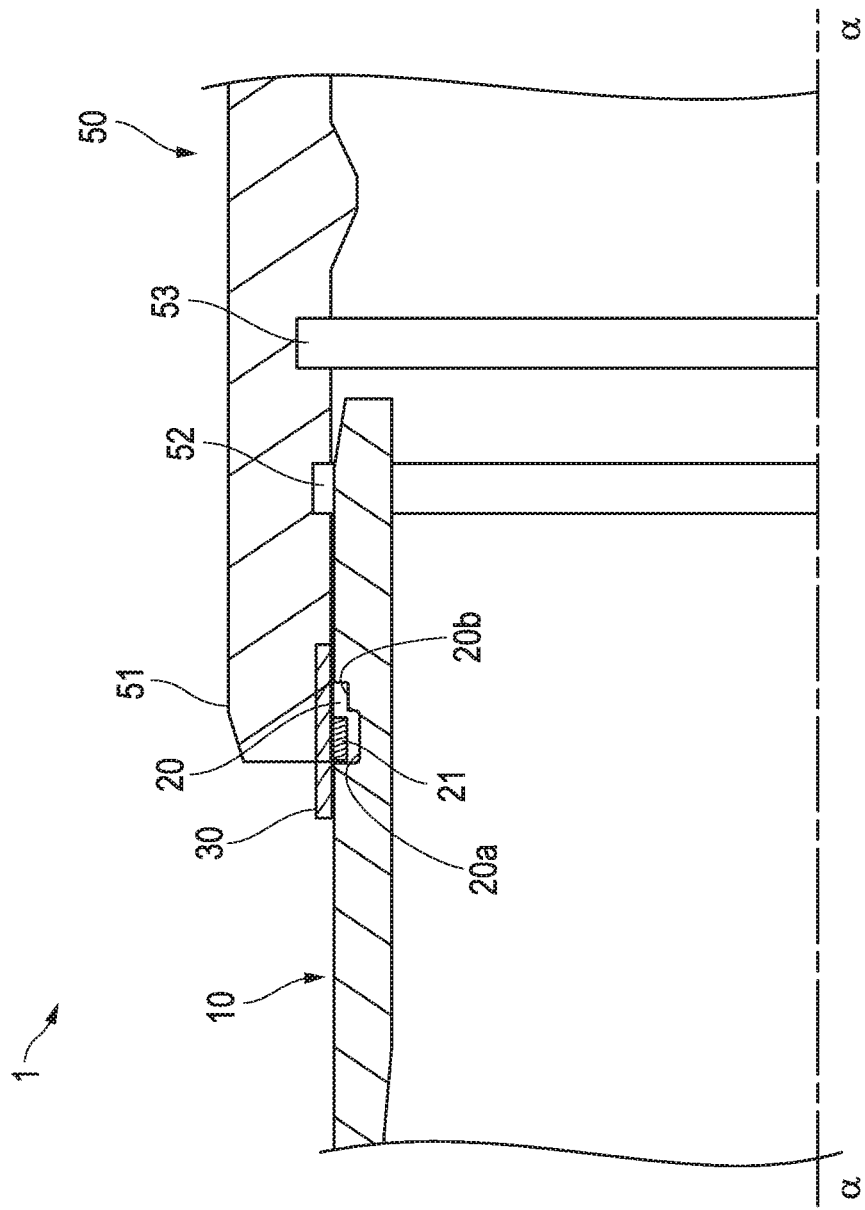

Each female end 51, as best seen in FIGS. 3 and 4a, may include a pocket area 57 at the axial end thereof. The pocket area 57 can have a top axial radius 58 that is slightly larger than the inner radius 56, which can be less than the inner radius of a spline groove (for example, inner radius of spline groove 52). Additionally, each pocket area 57 may include an open end 57a at the axial end of the coupling 50. An inner end 57b may be disposed opposite the open end 57a. Inner end 57b may be located closer to the center of the coupling 50 than the open end 57a in the axial direction. The pocket area 57 may be configured to receive the sheath 30 when pipe 10 is inserted into the female end 51 of the coupling 50. After insertion, the sheath 30 may be located between the pipe 10 and the coupling 50, and is stopped by the inner end 57b of the pocket area 57. In other words, the sheath cannot be inserted into the coupling 50 any farther than the radial position of the inner end 57b.

The pipe system may further include a retainer such as a retainer or spline 21 configured to be disposed in the spline groove 20 of pipe 10. The spline 21 may be located radially beneath the sheath 30 relative to the axis α, prior to assembly of the pipe system. The spline 21 may include a collapsed configuration in which the spline has a collapsed radius relative to the axis α when positioned at least partially beneath the sheath. The spline 21 may further include an expanded configuration in which the spline has an expanded radius relative to the axis α that is greater than the collapsed radius when the sheath does not at least partially cover the spline groove.

When the pipe system is assembled, the sheath 30 may be configured to uncover the spline groove 20 of the respective pipe 10. This action allows the spline 21 to expand into the respective spline groove 52 formed in the interior surface of the female end 51 of the coupling 50. Thus, with spline 21, each spline groove 52 of the coupling 50 is configured to engage and restrain an axial end of one pipe 10 to form the joint 1.

For example, FIG. 2 is an enlarged sectional side view illustrating a portion of an embodiment of the joint 1 of FIG. 1. FIG. 3 provides an enlarged sectional side view illustrating an embodiment of a portion of the joint 1 of FIG. 1, when the pipe 10 is fully inserted into the bell of the coupling 50, and prior to tension being applied to the joint 1.

According to various embodiments, when the pipe system is assembled and each sheath 30 is pushed back to uncover the spline groove 20 of the respective pipe 10, each spline 21 expands into the spline groove 52 (FIG. 3) formed in the interior surface of a respective female end 51 of the coupling 50. After the splines 21 engage respective spline grooves 52, the splines 21 may be subjected to a tension force (FIG. 4a) being exerted in an axial direction away from the joint 1.

FIG. 4a is an enlarged sectional side view illustrating a portion of the joint 1 of FIG. 1 when the pipes 10 are in a locked position and when forces are being exerted in axial directions away from the joint 1, according to an embodiment of the present disclosure.

In an embodiment, after at least one of the pipes 10 is initially inserted into the female or bell end 51 of the coupling 50 (FIG. 4*b*), the spline 21 of the respective pipe 10 is configured to be located in the spline groove 20 at the first spline groove portion 20*a*. After the spline 21 is expanded into spline groove 52 (FIG. 3) and tension is applied in an axial direction away from the joint 1 (FIG. 4*a*), the spline 21 is located in second spline groove portion 20*b*. In the locked position (FIG. 4*a*), having the spline 21 in spline groove 52 and second spline groove portion 20*b* reduces the occurrence of spline roll when in tension.

In various embodiments, the joint 1 may include a radio frequency identification device (RFID) 1101 (FIG. 11) associated therewith. The RFID 1101 may be configured to provide detection of a location of the coupling 50, by an external processor 1102. The RFID 1101 may be configured to communicate electronically with the external processor 1102 through a wireless network environment, such as network 1103. The wireless communication via network 1103 may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol.

Additionally or alternatively, the wireless communication may include, for example, short-range communication. The short-range communication may be conducted by, for example, at least one of wireless fidelity (WiFi), Bluetooth®, near field communication (NFC), or GNSS. GNSS may include, for example, at least one of global positioning system (GPS), Glonass® global navigation satellite system, Beidou® navigation satellite system, or Galileo®, the European global satellite-based navigation system. In the present disclosure, the terms 'GPS' and 'GNSS' are interchangeably used with each other. The network 1103 may be a communication network, for example, at least one of a computer network (for example, local area network (LAN) or wide area network (WAN)), the Internet, or a telephone network.

In an embodiment, the RFID (for example, RFID 1101 as shown in FIGS. 7-8*b* and 11) may be included with at least one of the sheaths 30. In another embodiment, the sheath may comprise a composite material having an RFID tag woven into the composite strands of the sheath material. Alternatively, the sheath may comprise an RFID tag connected to the sheath, yet not embedded therein. In other embodiments, an RFID may be disposed within the coupling or mounted to or formed in an exterior surface, such as in the spline groove, of the pipe or coupling.

Embodiments of the pipe system of FIGS. 1-4*b* and FIGS. 5-8*b* may further include a sensor 1104 (shown in FIGS. 7-8*b*) associated with the sheath and configured to detect leakage in at least one of the pipes 10 or in an area surrounding the spline groove.

In various embodiments, at least one of the sheaths 30 mounted to the respective pipe 10 may be configured to completely circumscribe a respective spline groove 20. At least one of the respective sheaths 30 may comprise a malleable material that is configured to compress within the respective spline groove when the respective pipe 10 is inserted into the coupling 50. The compression of the malleable sheath material may be configured to further create a seal between the respective pipe 10 and the coupling 50.

In various embodiments, the sheath 30 may include a malleable material comprising at least a low durometer elastomer. In another embodiment, at least one of the respective sheaths 30 may comprise a material configured to stiffen the pipe system after the respective pipe 10 is inserted into the bell of the coupling 50. In another embodiment, one or more of the respective sheaths 30 may become a non-functional or even a sacrificial part of the pipe system after the respective pipe 10 is inserted into bell of the coupling 50.

Integral Bell Pipes

Various embodiments of the present disclosure herein described may include another type of pipe joint 2, as shown in FIGS. 5-8. For example, the pipe joint 2 may be referred to as a sheathed spline locking joint with an integrated bell. The pipe joint 2 is formed by joining a first pipe 100 and a second pipe 111 directly together.

In some embodiments, pipes 100 and 111 may be identical, or substantially identical to each other. Various embodiments of the pipes 100 and 111 can be formed from a material comprising at least one of plastic, polymer, composite material, polyvinyl chloride (PVC), molecularly-oriented PVC (PVC-O), polypropylene (PP) or polyethylene (PE).

In various embodiments, one or both of pipes 100 and 111 may have an aspect ratio defined as wall thickness at the pipe body with respect to an outer diameter. The aspect ratio can be in a range, such as DR12 to DR40, as defined by industry standard ASTM D2241, which is incorporated herein by reference.

Figure 5:
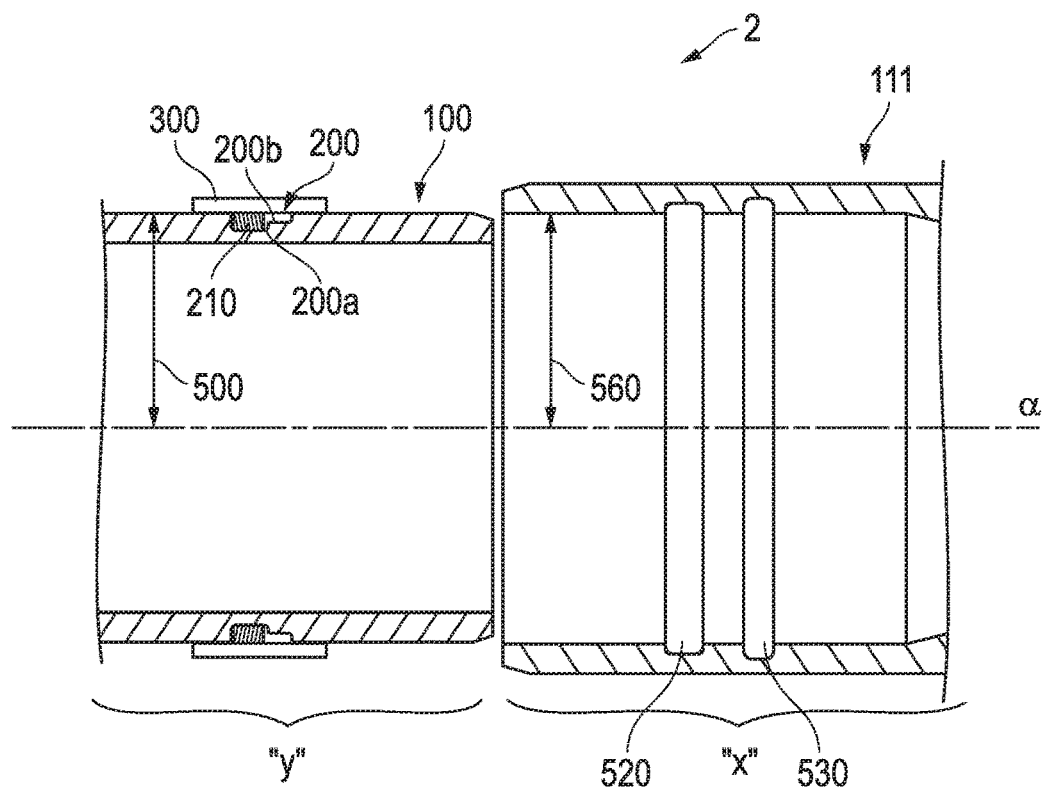
FIG. 5 is an enlarged sectional side view illustrating a sheathed spline locking joint with an integrated bell, according to an embodiment of the present disclosure.

Referring to FIG. 5, embodiments of pipes 100 and 111 may include a same size pipe body and a same axis α when the pipe joint 2 is formed. Other embodiments may disclose that pipes 100 and 111 have different sized pipe bodies and a same axis α. For example, FIG. 5 shows male end Y of pipe 100 and female end X of pipe 111. Each pipe 100, 111 may include one male end Y and one female end X. The male end Y may include an outer radius consistent with or identical to the pipe body outer radius 500. In various other embodiments, a pocket area (not shown) may be optionally added, and may function as described herein for pocket area 57.

According to various embodiments, each female end X may be formed in a bell shape and be configured to receive the male end Y of another pipe, such as that of pipe 100. Embodiments of each female end X may include an inner radius 560 and an inner surface. The inner radius 560 is slightly larger than the outer radius 500 of the exterior surface of the male end Y of pipe 100.

Figure 6:
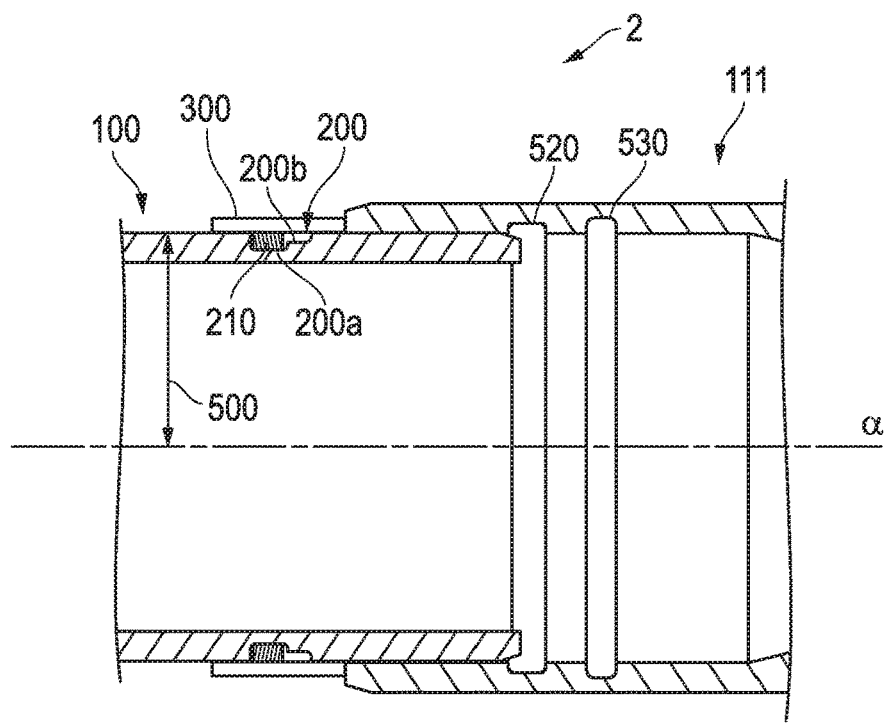
FIG. 6 is a sectional side view illustrating the sheathed spline locking joint with the integrated bell, after the spigot end of one pipe is inserted into the integrated bell portion of a second pipe, according to an embodiment of the present disclosure.
Figure 7:
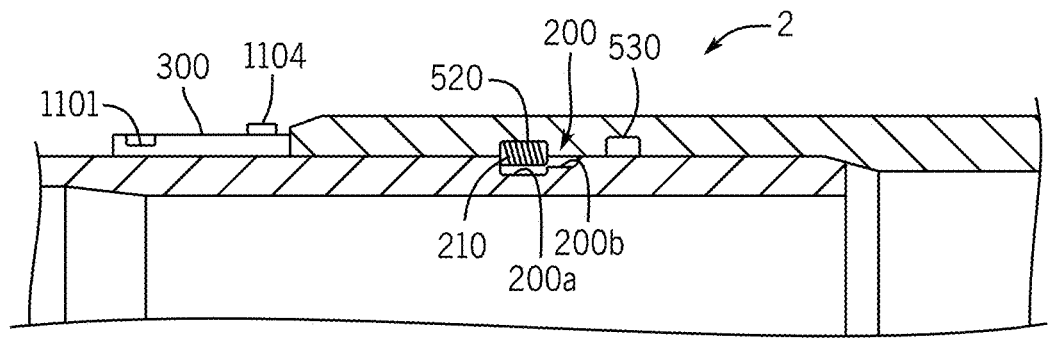
FIG. 7 is an enlarged sectional side view illustrating a portion of the sheathed spline locking joint with an integrated bell as in FIG. 5, after the spigot end of the pipe is fully inserted into the bell of the second pipe, according to an embodiment of the present disclosure.
Figure 8A:
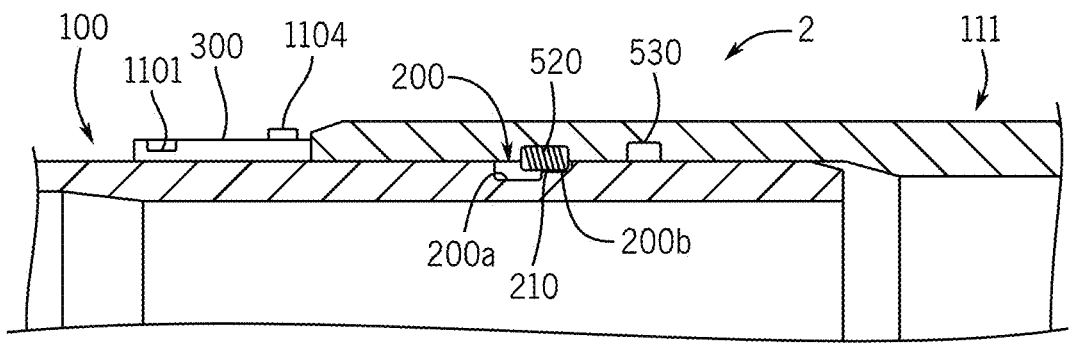
FIGS. 8a & 8b are enlarged sectional side views illustrating a portion of the sheathed spline locking joint with the integrated bell as in FIG. 5, when the pipes are in a locked position, according to an embodiment of the present disclosure.
Figure 8B:
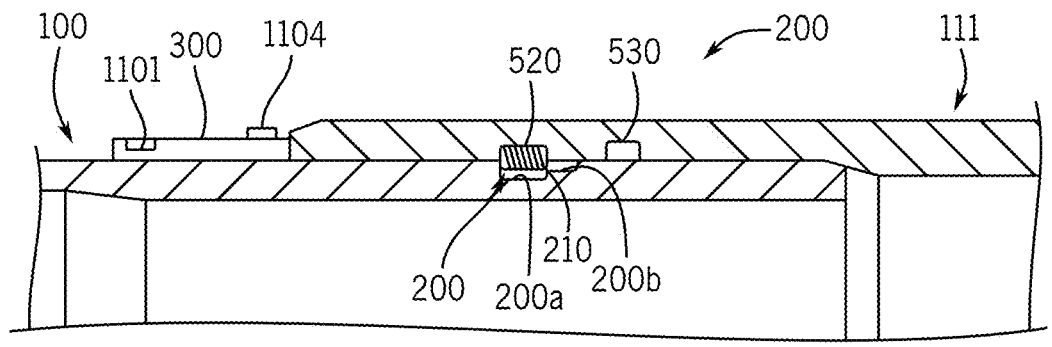

In some embodiments, each female end X may have a number of grooves formed in the inner surface. For example, as shown in FIGS. 5-8, spline groove 520 and seal groove 530 may be formed in the inner surface of each female end X. In some embodiments, the spline groove 520 may be configured to receive at least a portion of a respective spline 210 after assembly of the pipe system. In FIG. 6, for example, provides a sectional side view of the sheathed spline locking joint 2, after the male end Y of pipe 100 is initially inserted into the female end X of pipe 111.

As described herein regarding the embodiment of the pipe system having the coupling 50, various embodiments of the sheathed spline locking joint 2 may have similar functionality. For example, the male end Y of pipe 100 may include exterior surface, a spline groove 200 formed therein, and a sheath 300 configured to temporarily contain a spline 210 in spline groove 200.

The sheath 300 may be mounted to pipe 100 so as to at least partially cover the spline groove 200 prior to assembly of the pipe system. Various embodiments of the spline 210 may be configured to be disposed in the spline groove 200, radially beneath the sheath 300 relative to the axis α, prior to insertion of pipe 100 into pipe 111. The spline 210 may include a collapsed radius (FIGS. 5 and 6) relative to the axis α, and an expanded radius (FIGS. 7 and 8) relative to the axis α, which are analogous to FIGS. 1-4.

In some embodiments, when pipe 100 is initially inserted into pipe 111, the spline 210 of the pipe 100 seats in spline groove 520 (FIG. 7) and temporarily resides in first spline groove portion 200a. Thereafter (FIGS. 8a and 8b), the spline 210 resides in second spline groove portion 200b.

According to various embodiments, when the sheathed spline locking joint 2 is assembled, the sheath 300 is axially pushed back to uncover the spline groove 200 of pipe 100, the spline 210 expands into the spline groove 520 (FIG. 8b) formed in the interior surface of the female end X of pipe 101. After the spline 210 engages in the spline groove 520, the spline 210 is subjected to a tension force (FIG. 8a) being exerted in an axial direction away from the joint.

As described herein for other embodiments, the joint 2 may further include a radio frequency identification device (RFID) (not shown). The RFID may be configured to provide at least one of pipe assembly detection or information about the pipe assembly, by an external processor (not shown). In an embodiment, the RFID may be pre-programmed and configured to link stored data related to the pipe assembly to an external processor. For example, the stored data may include location data of the RFID.

Figure 11:
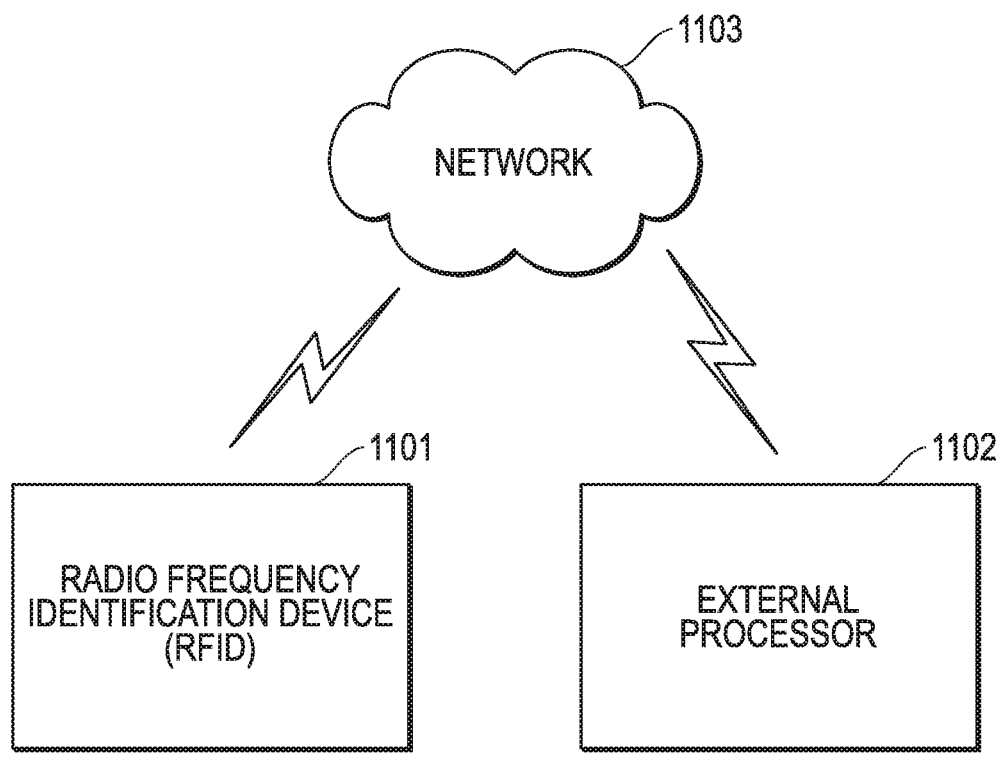
FIG. 11 is a schematic diagram of a radio frequency identification system, according to various embodiments of the present disclosure.

A detailed description as to FIG. 11 and the features thereof have been described at length above, and will not be repeated again for the sake of clarity. However, the same or similar principles as described in regards to an RFID associated in prior embodiments are included in various other embodiments of the present disclosure.

In an embodiment, the sheath 300 may comprise a ring shape and is configured to retain the spline 210 in the spline groove 200 of pipe 100 prior to installation of the pipes 100, 111. The spline 210 may expand when it axially aligns with the spline groove 520 of pipe 111.

Method of Joining Pipes—No Coupling

Figure 9:
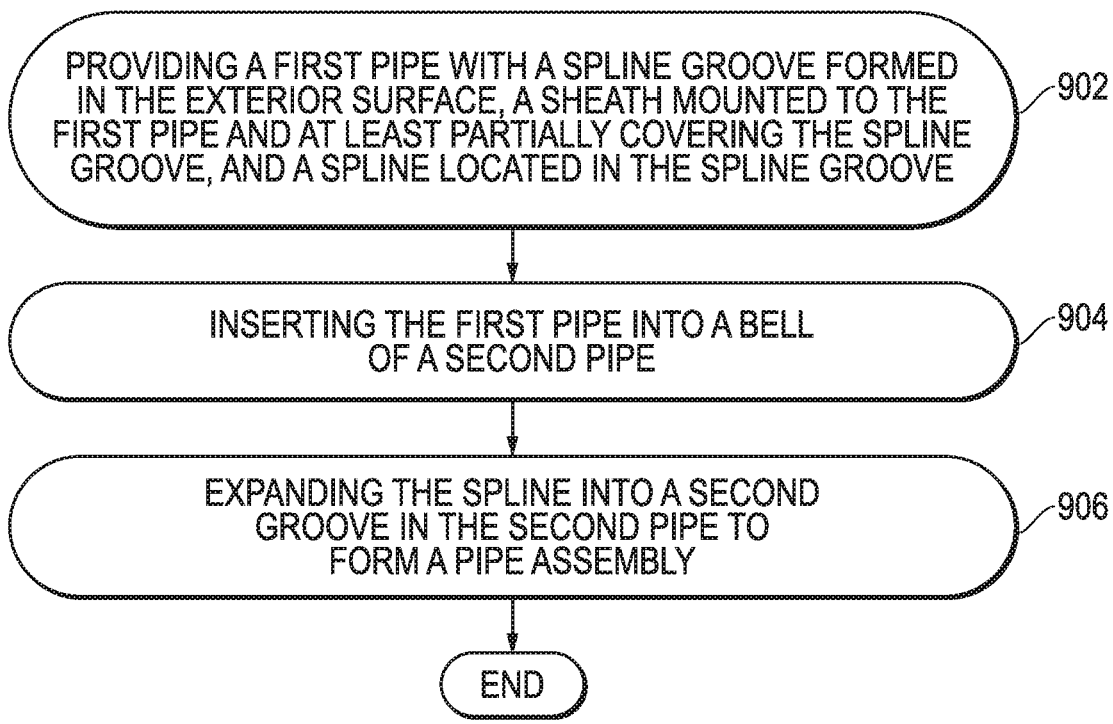
FIG. 9 is a flowchart illustrating a method of assembling first and second pipes into opposite ends of a coupling, according to an embodiment of the present disclosure.

Various embodiments of the present disclosure provide a method of joining pipes. In some embodiments, the method may not include using a coupling. Referring to FIG. 9, the method begins with operation 902, which includes providing a first pipe with an axis, an exterior surface, and a spline groove formed in the exterior surface. A sheath may be mounted to the first pipe such that the sheath at least partially covers the spline groove. In addition, prior to assembly, a spline may be disposed in the spline groove radially beneath the sheath relative to the axis.

The method may further include, at operation 904, inserting the first pipe into a bell of a second pipe, such that the sheath is at least partially displaced to uncover the spline.

Operation 906 discloses expanding the spline into a second spline groove in the second pipe to form a pipe assembly.

Additional operations may include moving the first pipe out of the second pipe, such that the spline engages in a shallower end of the spline groove in the first pipe to maintain a locked position of the pipe assembly and reduce occurrence of and/or prevent spline rolling.

For example, the sheath may comprise a malleable material (e.g. a low durometer elastomer), and when the first pipe is inserted into the bell of the second pipe, the sheath may compress within the spline groove and create a seal between the first pipe and the second pipe due to tension.

Further operations may include pre-programming a radio frequency identification device (RFID) to link to an external processor and transfer data related to the pipe assembly. The transferred data may include at least one of location data of the RFID or data obtained using at least one sensor for determining leakage information.

An embodiment may include attaching the RFID to the sheath before inserting the first pipe into the bell of the second pipe. For example, attaching the RFID may include embedding the RFID within the sheath. In other embodiments, the RFID may be mounted to an exterior surface of the pipe joint, or attached in any other foreseeable, functional manner.

The method may further include receiving information from the RFID using an external processor, and identifying a location of the pipe assembly based on the received information. The RFID may enable an operation of detecting a leakage in the pipe assembly based on the received information.

In various embodiments, the method may include testing the RFID using a beacon associated with the RFID or the pipe assembly. Various other operations are foreseeable to those of ordinary skill in the art, and the present disclosure is intended to include these operations.

Method of Joining Pipes—Including a Coupling

Figure 10:
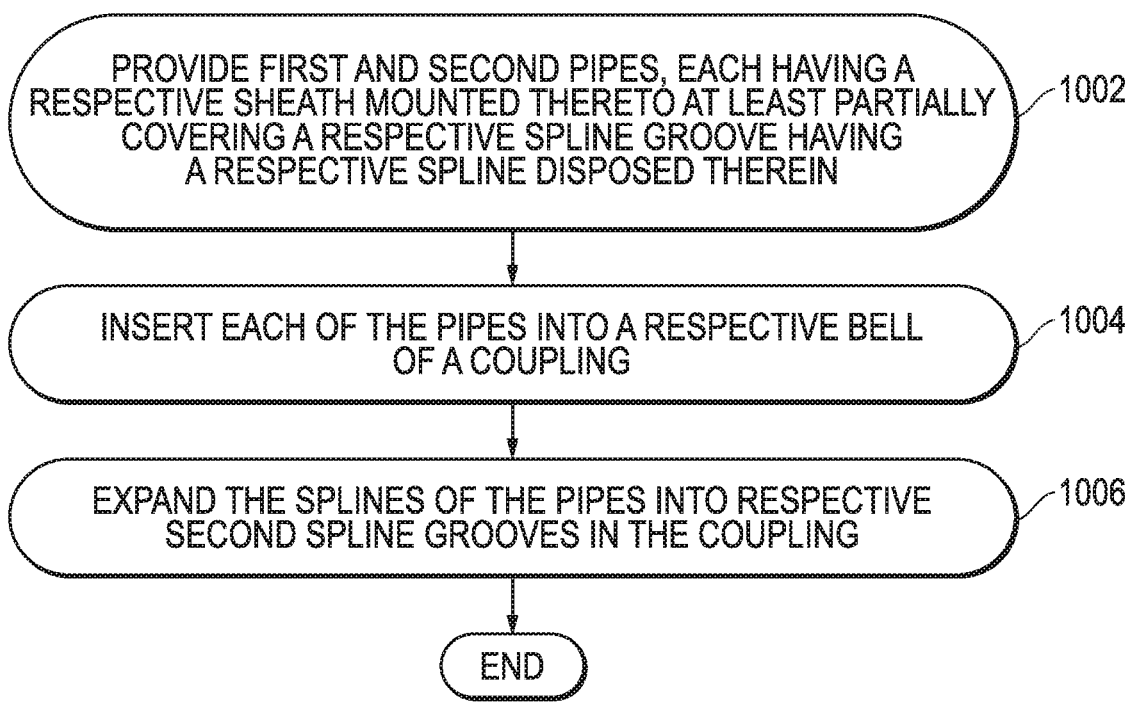
FIG. 10 is a flowchart illustrating a method of assembling a sheathed spline locking joint with an integrated bell, according to an embodiment of the present disclosure.

Various embodiments of the present disclosure provide a method of joining pipes using a coupling. Referring to FIG. 10, operation 1002 includes providing first and second pipes, each comprising a same axis, a respective exterior surface, and a spline groove formed in the respective exterior surface. Additionally, a sheath is mounted to each pipe such that the sheath at least partially covers a respective spline groove. A spline is located in each spline groove, disposed radially beneath a respective sheath relative to the axis.

The method continues with operation 1004 which includes inserting each of the pipes into a respective bell of a coupling.

The method further includes operation 1006 that includes expanding the splines of the pipes into respective second spline grooves in the coupling.

As with the previous method described above, this method may include many additional other operations. For example, the method may include moving each of the pipes, such that the respective splines engage in a shallower end of the spline groove in the respective pipe to maintain a locked position of the pipe assembly and reduce occurrence of spline rolling.

In examples where the sheath comprises a malleable material, when the each pipe is inserted into the bell of the coupling, the respective sheath compresses within the spline groove and creates a seal between the respective pipe and the coupling due to tension.

In various embodiments using an RFID, additional operations may include pre-programming an RFID to link to an external processor and transfer data related to the pipe assembly. For example, the transferred data may include at least one of location data of the RFID or data obtained using at least one sensor for determining leakage information. The method may include attaching the RFID to at least one of the sheaths before inserting the respective pipe into the bell of the coupling. In some embodiments, attaching the RFID may include embedding the RFID within the at least one sheath.

The method may further include receiving information from the RFID using an external processor, or identifying a location of the RFID and associated pipe assembly based on received information. Other embodiments may include receiving information from an RFID using an external processor, and detecting a leakage in the pipe assembly based on the received information. Various embodiments may further include testing the RFID for the pipe assembly.

This written description uses various examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

In some embodiments, various functions described in this patent document are implemented or supported by a computer program that is formed from computer readable program code and are embodied in a computer readable medium. The phrase "computer readable program code" includes any type of computer code, including source code, object code, and executable code. The phrase "computer readable medium" includes any type of medium configured to be accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other versions may include one or more of the following embodiments:

Embodiment 1

A pipe, comprising:
a tubular member having a central axis, an exterior surface, and a spline groove formed in the exterior surface;
a sheath mounted to the tubular member such that the sheath at least partially covers the spline groove; and
a spline located in the spline groove radially beneath the sheath relative to the central axis.

Embodiment 2

The pipe of any of these embodiments, wherein the spline is configured to comprise:
a collapsed configuration having a collapsed radius relative to the axis when positioned at least partially beneath the sheath, and
an expanded configuration having an expanded radius relative to the central axis that is greater than the collapsed radius when the sheath does not at least partially cover the spline groove.

Embodiment 3

The pipe of any of these embodiments, wherein the sheath completely circumscribes the spline groove.

Embodiment 4

The pipe of any of these embodiments, wherein the spline groove comprises a plurality of radial depths relative to the central axis.

Embodiment 5

The pipe of any of these embodiments, wherein the spline groove is located adjacent to an axial end of the tubular member, the spline groove comprises a first radial depth located farthest from the axial end, and a second radial depth located axially between the axial end and the first radial depth, wherein the first radial depth is greater than the second radial depth.

Embodiment 6

The pipe of any of these embodiments, further comprising a radio frequency identification device (RFID) associated with the sheath and configured to provide detection of the pipe by an external processor.

Embodiment 7

The pipe of any of these embodiments, wherein the RFID is embedded in the sheath.

Embodiment 8

The pipe of any of these embodiments, further comprising a radio frequency identification device (RFID) disposed in the spline groove and configured to provide detection of the pipe by an external processor.

Embodiment 9

The pipe of any of these embodiments, further comprising a sensor associated with the sheath and configured to detect leakage in the pipe or in an area surrounding the spline groove.

Embodiment 10

The pipe of any of these embodiments, wherein the sheath comprises a malleable material that is configured to compress within the spline groove when inserted into a second pipe and form a seal between the tubular member and the second pipe when under tension.

Embodiment 11

The pipe of any of these embodiments, wherein the malleable material includes a low durometer elastomer.

Embodiment 12

A pipe assembly, comprising:
a first pipe comprising a bell including an open end and an axis that is central and longitudinally-extending, the bell comprising an inner radius relative to the axis and a spline groove, wherein the inner radius is defined at an inner circumference of the bell at positions not having a spline groove or a seal groove;

a second pipe having an exterior surface, a spline groove in the exterior surface, and a spigot end, the spigot end having an outer radius relative to the axis that is smaller than the inner radius of the bell and disposed within the bell substantially along the axis;

a sheath disposed around the spigot end of the second pipe such that the sheath at least partially covers the spline groove; and a spline located in the spline groove radially beneath the sheath relative to the axis.

Embodiment 13

The pipe assembly of any of these embodiments, wherein the spline is configured to comprise:

a collapsed configuration having a collapsed radius relative to the axis when positioned at least partially beneath the sheath, and an expanded configuration having an expanded radius that is greater than the collapsed radius when the sheath does not at least partially cover the spline groove.

Embodiment 14

The pipe assembly of any of these embodiments, wherein the sheath is configured to completely circumscribe the spline groove.

Embodiment 15

The pipe assembly of any of these embodiments, wherein the spline groove comprises a plurality of radial depths relative to the axis.

Embodiment 16

The pipe assembly of any of these embodiments, wherein the spline groove is located adjacent to the spigot end of the second pipe, the spline groove comprises a first radial depth located farthest from the spigot end, and a second radial depth located axially between the spigot end and the first radial depth, wherein the first radial depth is greater than the second radial depth.

Embodiment 17

The pipe assembly of any of these embodiments, further comprising a radio frequency identification device (RFID) associated with the sheath and configured to provide detection of the RFID location by an external processor.

Embodiment 18

The pipe assembly of any of these embodiments, wherein the RFID is embedded in the sheath.

Embodiment 19

The pipe assembly of any of these embodiments, further comprising a radio frequency identification device (RFID) disposed in the spline groove and configured to provide detection of RFID by an external processor.

Embodiment 20

The pipe assembly of any of these embodiments, further comprising a radio frequency identification device (RFID) disposed in the spline and configured to provide detection of RFID by an external processor.

Embodiment 21

The pipe assembly of any of these embodiments, further comprising a sensor associated with the sheath and configured to detect leakage in at least one of the first pipe, the second pipe, or an area surrounding the spline groove.

Embodiment 22

The pipe assembly of any of these embodiments, further comprising a radio frequency identification device (RFID) mounted to in an interior of the bell of the first pipe.

Embodiment 23

The pipe assembly of any of these embodiments, further comprising a radio frequency identification device (RFID) mounted in an exterior of the pipe assembly and configured to provide at least one of pipe assembly detection or information about the pipe assembly to an external processor.

Embodiment 24

The pipe assembly of any of these embodiments, wherein the RFID is pre-programmed and configured to link stored data related to the pipe assembly to the external processor, wherein the stored data includes location data of the RFID.

Embodiment 25

The pipe assembly of any of these embodiments, wherein the RFID is configured to retrieve data in response to a query from the external processor, and wherein the RFID retrieves data obtained using at least one sensor configured to determine whether a leakage exists within or around at least one of the spigot end of the second pipe or the bell of the first pipe.

Embodiment 26

The pipe assembly of any of these embodiments, wherein the sheath comprises a malleable material and is configured to compress within the spline groove when inserted into a second pipe and create a seal between the first pipe and the second pipe when under tension.

Embodiment 27

The pipe assembly of any of these embodiments, wherein the sheath comprises a material configured to stiffen the pipe assembly.

Embodiment 28

The pipe assembly of any of these embodiments, wherein the sheath becomes a non-functional or sacrificial part of the pipe assembly after the spigot end of the second pipe is inserted into the bell of the first pipe.

Embodiment 29

The pipe assembly of any of these embodiments, wherein in response to application of tension to the pipe assembly, the spline is configured to engage in the spline groove at the second radial depth and maintain a locked position with the first and second pipes and reduce occurrence of spline rolling.

Embodiment 30

The pipe assembly of any of these embodiments, wherein the sheath comprises a ring shape and is configured to retain the spline in the second pipe prior to installation of the second pipe into the first pipe.

Embodiment 31

The pipe assembly of any of these embodiments, wherein the spline is configured to:
expand when it axially aligns with the spline groove in the bell,
move axially into a shallower spline groove in the second pipe when the pipe assembly is put under tension, and
create a positive lock between the spigot end of the second pipe and the bell of the first pipe.

Embodiment 32

A pipe system, comprising:
a first pipe having an axis, an exterior surface, a first spline groove formed in the exterior surface, a sheath configured to be mounted to the first pipe such that the sheath at least partially covers the first spline groove prior to assembly of the pipe system, and a spline located in the first spline groove radially beneath the sheath relative to the axis prior to assembling the pipe system; and
a second pipe having a bell configured to receive the first pipe, the second pipe having a second spline groove configured to receive at least a portion of the spline after the pipe system is assembled and, when the pipe system is assembled, and the sheath is configured to uncover the first spline groove such that the spline expands into the second spline groove.

Embodiment 33

The pipe system of any of these embodiments, wherein the sheath is configured to completely circumscribe the first spline groove prior to assembly of the pipe system.

Embodiment 34

The pipe system of any of these embodiments, wherein the first spline groove comprises a plurality of radial depths relative to the axis.

Embodiment 35

The pipe system of any of these embodiments, wherein the first spline groove is located adjacent to an axial end of the first pipe, the first spline groove comprises a first radial depth located farthest from the axial end, and a second radial depth located axially between the axial end and the first radial depth, wherein the first radial depth is greater than the second radial depth.

Embodiment 36

The pipe system of any of these embodiments, further comprising a radio frequency identification device (RFID) associated with the sheath and configured to provide detection of the RFID location by an external processor.

Embodiment 37

The pipe system of any of these embodiments, wherein the RFID is embedded in the sheath.

Embodiment 38

The pipe system of any of these embodiments, further comprising a radio frequency identification device (RFID) disposed in the first spline groove and configured to provide detection of an axial end of the first pipe by an external processor.

Embodiment 39

The pipe system of any of these embodiments, further comprising a radio frequency identification device (RFID) disposed in the second spline groove and configured to provide detection of the pipe system by an external processor.

Embodiment 40

The pipe system of any of these embodiments, further comprising a sensor associated with the sheath and configured to detect leakage in the pipe system.

Embodiment 41

The pipe system of any of these embodiments, wherein the sensor is embedded in the sheath.

Embodiment 42

The pipe system of any of these embodiments, wherein the sheath comprises a malleable material and is configured to compress within the first spline groove when inserted into the second pipe and create a seal between the first pipe and the second pipe when under tension.

Embodiment 43

The pipe system of any of these embodiments, wherein the sheath becomes a non-functional or sacrificial part of the pipe system after the first pipe is inserted into the bell of the second pipe.

Embodiment 44

The pipe system of any of these embodiments, wherein the sheath comprises a material configured to stiffen the pipe assembly.

Embodiment 45

The pipe system of any of these embodiments, wherein when the first pipe is inserted into the second pipe, the spline is configured to engage in the first spline groove at the second radial depth and maintain a locked position of the pipe assembly and reduce occurrence of spline rolling.

Embodiment 46

A pipe system, comprising:
first and second pipes, each having:
an axis, an exterior surface, a spline groove formed in the exterior surface, a sheath configured to be mounted thereto, such that the sheath at least partially covers the spline groove prior to assembly of the pipe system, and a spline configured to be located in the spline groove thereof radially beneath the sheath relative to the axis, prior to assembly of the pipe system; and the pipe system further comprises:

a coupling having a bell for and configured to receive each of the first and second pipes, each bell having a second spline groove configured to receive at least a portion of a respective spline after assembly of the pipe system and, when the pipe system is assembled, the sheaths are configured to uncover the spline grooves such that the splines expand into the second spline grooves.

Embodiment 47

The pipe system of any of these embodiments, wherein at least one of the sheaths is configured to completely circumscribe a respective spline groove.

Embodiment 48

The pipe system of any of these embodiments, wherein at least one of the spline grooves comprises a plurality of radial depths relative to the axis.

Embodiment 49

The pipe system of any of these embodiments, wherein the spline groove in each pipe is located adjacent to an axial end thereof and comprises a first radial depth located farthest from the axial end, and a second radial depth located axially between the axial end and the first radial depth, wherein the first radial depth is greater than the second radial depth.

Embodiment 50

The pipe system of any of these embodiments, further comprising a radio frequency identification device (RFID) associated with at least one of the respective sheaths on the respective pipes, wherein the RFID is configured to provide detection of the coupling location by an external processor.

Embodiment 51

The pipe system of any of these embodiments, wherein the RFID is embedded in the sheath.

Embodiment 52

The pipe system of any of these embodiments, further comprising a radio frequency identification device (RFID) disposed within the coupling.

Embodiment 53

The pipe system of any of these embodiments, further comprising a radio frequency identification device (RFID) mounted to an exterior of the coupling.

Embodiment 54

The pipe system of any of these embodiments, wherein at least one of the respective sheaths comprises a malleable material and is configured to compress within the respective spline groove when the respective pipe is inserted into the coupling and create a seal between the respective pipe and the coupling when under tension.

Embodiment 55

The pipe system of any of these embodiments, wherein one or more of the respective sheaths becomes a non-functional or sacrificial part of the pipe system after the respective pipe is inserted into bell of the coupling.

Embodiment 56

The pipe system of any of these embodiments, wherein at least one of the respective sheaths comprises a material configured to stiffen the pipe system after the respective pipe is inserted into the bell of the coupling.

Embodiment 57

The pipe system of any of these embodiments, wherein when at least one of the first pipe or the second pipe is inserted into the bell of the coupling, the spline of the respective pipe is configured to engage in the spline groove of the respective pipe at the second radial depth and maintain a locked position with the spline and reduce occurrence of spline rolling.

Embodiment 58

A method of joining pipes, the method comprising:
providing a first pipe with an axis, an exterior surface, a spline groove formed in the exterior surface, a sheath mounted to the first pipe such that the sheath at least partially covers the spline groove, and a spline located in the spline groove radially beneath the sheath relative to the axis;
inserting the first pipe into a bell of a second pipe, such that the sheath is at least partially displaced to uncover the spline; and
expanding the spline into a second spline groove in the second pipe to form a pipe assembly.

Embodiment 59

The method of any of these embodiments, further comprising:
moving the first pipe out of the second pipe, such that the spline engages in a shallower end of the spline groove in the first pipe to maintain a locked position of the pipe assembly and reduce occurrence of spline rolling.

Embodiment 60

The method of any of these embodiments, wherein the sheath comprises a malleable material, and
when the first pipe is inserted into the bell of the second pipe, the sheath compresses within the spline groove and creates a seal between the first pipe and the second pipe due to tension.

Embodiment 61

The method of any of these embodiments, further comprising:
pre-programming a radio frequency identification device (RFID) to link to an external processor and transfer data related to the pipe assembly, wherein the transferred data includes at least one of location data of the RFID or data obtained using at least one sensor for determining leakage information; and attaching the RFID to the sheath before inserting the first pipe into the bell of the second pipe.

Embodiment 62

The method of any of these embodiments, wherein attaching the RFID includes embedding the RFID within the sheath.

Embodiment 63

The method of any of these embodiments, further comprising:
receiving information from the RFID using an external processor; and
identifying a location of the pipe assembly based on the received information.

Embodiment 64

The method of any of these embodiments, further comprising:
receiving information from the RFID using an external processor; and
detecting a leakage in the pipe assembly based on the received information.

Embodiment 65

The method of any of these embodiments, further comprising:
testing the RFID using a beacon associated with the RFID or the pipe assembly.

Embodiment 66

A method of joining pipes, the method comprising:
providing first and second pipes, each comprising:
a same axis, a respective exterior surface, a spline groove formed in the respective exterior surface, a sheath mounted to each pipe such that the sheath at least partially covers a respective spline groove, and a spline located in each the spline groove radially beneath a respective sheath relative to the axis;
inserting each of the pipes into a respective bell of a coupling, such that the sheaths are at least partially displaced to uncover the splines; and
expanding the splines of the pipes into respective second spline grooves in the coupling to form a pipe assembly.

Embodiment 67

The method of any of these embodiments, further comprising:
moving each of the pipes, such that the respective splines engage in a shallower end of the spline groove in the respective pipe to maintain a locked position of the pipe assembly and reduce occurrence of spline rolling.

Embodiment 68

The method of any of these embodiments, wherein the sheath comprises a malleable material, and
when the each pipe is inserted into the bell of the coupling, the respective sheath compresses within the spline groove and creates a seal between the respective pipe and the coupling due to tension.

Embodiment 69

The method of any of these embodiments, further comprising:
pre-programming a radio frequency identification device (RFID) to link to an external processor and transfer data related to the pipe assembly, wherein the transferred data includes at least one of location data of the RFID or data obtained using at least one sensor for determining leakage information; and
attaching the RFID to at least one of the sheaths before inserting the respective pipe into the bell of the coupling.

Embodiment 70

The method of any of these embodiments, wherein attaching the RFID includes embedding the RFID within the at least one sheath.

Embodiment 71

The method of any of these embodiments, further comprising:
receiving information from the RFID using an external processor; and
identifying a location of the RFID and associated pipe assembly based on the received information.

Embodiment 72

The method of any of these embodiments, further comprising:
receiving information from the RFID using an external processor; and
detecting a leakage in the pipe assembly based on the received information.

Embodiment 73

The method of any of these embodiments, further comprising:
testing the RFID for the pipe assembly.

Embodiment 74

A pipe system, comprising:
a pipe having an axis, an exterior and an external spline groove in the exterior;
a tubular member having an interior and an internal spline groove, and the tubular member is configured to be joined to the pipe to form a pipe assembly; and
a spline having a collapsed configuration in which the spline has a collapsed radius relative to the axis prior to formation of the pipe assembly, and an expanded configuration in which the spline has an expanded radius relative to the axis after formation of the pipe assembly, and the expanded radius is greater than the collapsed radius.

Embodiment 75

A pipe system, comprising:
a pipe having an axis, an exterior and an external spline groove in the exterior;
a tubular member having an interior and an internal spline groove, and the tubular member is configured to be joined to the pipe to form a pipe assembly; and a spline configured to secure the pipe to the tubular member, wherein an entirety of the spline is configured to move radially relative to the axis when the pipe system goes from pre-assembly of the pipe assembly to post-assembly of the pipe assembly.

Embodiment 76

The pipe system of any of these embodiments, wherein the spline has a radial wall thickness, and the entirety of the spline is configured to move radially at least about 10% of the radial wall thickness, at least about 20%, at least about 30%, at least about 40%, at least about 50% of the radial wall thickness.

Embodiment 77

A pipe system, comprising:
a pipe having an axis, an exterior and an external spline groove in the exterior;
a tubular member having an interior and an internal spline groove, and the tubular member is configured to be joined to the pipe to form a pipe assembly; and
a spline configured to secure the pipe to the tubular member, wherein an entirety of the spline is configured to move axially relative to the axis when the pipe system goes from pre-assembly of the pipe assembly to post-assembly of the pipe assembly.

Embodiment 78

The pipe system of any of these embodiments, wherein the spline has an axial wall thickness, and the entirety of the spline is configured to move axially at least about 10% of the axial wall thickness, at least about 20%, at least about 30%, at least about 40%, at least about 50% of the axial wall thickness, and not greater than about 200% of the axial wall thickness, not greater than about 175%, not greater than about 150%, not greater than about 125%, not greater than about 100% of the axial wall thickness.

Embodiment 79

The pipe system of any of these embodiments, wherein the tubular member is one of a coupling and a second pipe.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves. Accordingly, the claims herein are not intended to invoke 35 U.S.C. § 112(f) "mean-plus-function" interpretation (35 U.S.C. 112, sixth paragraph for pre-AIA applications).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans in the relevant art will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:
1. A pipe, comprising:
a tubular member having a central axis, an exterior surface, and a retainer groove formed in the exterior surface;
a sheath mounted to the tubular member such that the sheath at least partially covers the retainer groove; and
a retainer located in the retainer groove radially beneath the sheath relative to the central axis,
wherein the sheath is an annular ring shape with an inner surface of a constant diameter that contacts the exterior surface of the tubular member,
wherein the retainer groove is located adjacent to an axial end of the tubular member,
wherein the retainer groove includes a stepped bottom surface configured so that a first radial depth to the stepped bottom surface is located farthest from the axial end and a second radial depth to the stepped bottom surface is located axially between the axial end and the first radial depth, and
wherein the first radial depth is greater than the second radial depth.

2. The pipe of claim 1, wherein the retainer is configured to comprise:
   a collapsed configuration having a collapsed radius relative to the axis when positioned at least partially beneath the sheath, and
   an expanded configuration having an expanded radius relative to the central axis that is greater than the collapsed radius when the sheath does not at least partially cover the retainer groove.

3. The pipe of claim 1, wherein the sheath completely circumscribes the retainer groove.

4. The pipe of claim 1, wherein the retainer groove comprises a plurality of radial depths relative to the central axis.

5. The pipe of claim 1, further comprising a radio frequency identification device (RFID) associated with the sheath and configured to provide detection of the pipe by an external processor.

6. The pipe of claim 1, further comprising a sensor associated with the sheath and configured to detect leakage in the pipe or in an area surrounding the retainer groove.

7. The pipe of claim 1, wherein the sheath comprises a malleable material that is configured to compress within the retainer groove when inserted into a second pipe and form a seal between the tubular member and the second pipe when under tension.

* * * * *